US012626130B2

(12) United States Patent     (10) Patent No.:   US 12,626,130 B2

Dong et al.     (45) Date of Patent:    May 12, 2026

(54) METHOD AND DEVICE FOR COMPRESSING NEURAL NETWORK

(71) Applicant: MONTAGE TECHNOLOGY CO., LTD., Shanghai (CN)

(72) Inventors: Zhen Dong, Shanghai (CN); Yuanfei Nie, Shanghai (CN); Huan Feng, Shanghai (CN)

(73) Assignee: MONTAGE TECHNOLOGY CO., LTD., Shanghai (CN)

( * ) Notice: Subject to any disclaimer, the term of this patent is extended or adjusted under 35 U.S.C. 154(b) by 1107 days.

(21) Appl. No.: 17/530,486

(22) Filed: Nov. 19, 2021

(65) Prior Publication Data

US 2022/0164665 A1    May 26, 2022

(30) Foreign Application Priority Data

Nov. 20, 2020    (CN) .......................... 202011308961.0

(51) Int. Cl.
   *G06N 3/082*     (2023.01)
   *G06N 3/04*     (2023.01)
       (Continued)

(52) U.S. Cl.
   CPC ............... *G06N 3/082* (2013.01); *G06N 3/04* (2013.01)

(58) Field of Classification Search
   CPC .................................. G06N 3/082; G06N 3/04
   See application file for complete search history.

(56) References Cited

U.S. PATENT DOCUMENTS

2018/0107925 A1    4/2018   Choi et al.
2019/0171935 A1    6/2019   Agrawal et al.
(Continued)

FOREIGN PATENT DOCUMENTS

CN    107644252 A    1/2018
CN    110084364 A    8/2019
(Continued)

OTHER PUBLICATIONS

Cai, Zhaowei, and Nuno Vasconcelos. "Rethinking differentiable search for mixed-precision neural networks." Proceedings of the IEEE/CVF Conference on Computer Vision and Pattern Recognition. 2020. (Year: 2020).*

Hanxiao Liu, Karen Simonyan, Yiming Yang, "Darts:Differentiable Architecture Search", arxiv preprint arxiv:1806.09055,2018.

Kkuan Wang, Zhijian Liu, Yujun Lin, Ji Lin, and Song Han, "HAQ:Hardware-Aware Automated Quantization with Mixed Precision", The IEEE Conference on Computer Vision and Pattern Recognition(CVPR), 2019.

(Continued)

*Primary Examiner* — Abdullah Al Kawsar
*Assistant Examiner* — Gary Mac
(74) *Attorney, Agent, or Firm* — Junhe Law Office P.C.; James J. Zhu

(57)       ABSTRACT

A method for compressing a neural network includes: obtaining a neural network including J operation layers; compressing a $j^{th}$ operation layer with $K_j$ compression ratios to generate $K_j$ operation branches; obtaining $K_j$ weighting factors; replacing the $j^{th}$ operation layer with the $K_j$ operation branches weighted by the $K_j$ weighting factors to generate a replacement neural network; performing forward propagation to the replacement neural network, a weighted sum operation being performed on $K_j$ operation results generated by the $K_j$ operation branches with the $K_j$ weighting factors and a result of the weighted sum operation being used as an output of the $j^{th}$ operation layer; performing backward propagation to the replacement neural network, updated values of the $K_j$ weighting factors being calculated based on a model loss; and determining an operation branch corresponding to the maximum value of the updated values of the $K_j$ weighting factors as a compressed $j^{th}$ operation layer.

17 Claims, 6 Drawing Sheets

(a)                  (b)

(51) Int. Cl.

| | | |
|---|---|---|
| *G06N 3/045* | (2023.01) |
| *G06N 3/0464* | (2023.01) |
| *G06N 3/0495* | (2023.01) |
| *G06N 3/084* | (2023.01) |
| *G06N 3/09* | (2023.01) |
| G06N 3/063 | (2023.01) |

(56) References Cited

U.S. PATENT DOCUMENTS

| | | |
|---|---|---|
| 2020/0293876 A1 | 9/2020 | Phan et al. |
| 2021/0303972 A1* | 9/2021 | Lee ...................... G06N 3/0464 |
| 2022/0114479 A1* | 4/2022 | Zhao .................... G06N 3/0985 |

FOREIGN PATENT DOCUMENTS

| | | |
|---|---|---|
| CN | 110751274 A | 2/2020 |
| CN | 111105017 A | 5/2020 |
| CN | 111553480 A | 8/2020 |

OTHER PUBLICATIONS

Mingxing Tan, Quoc V Le, "EfficientNet:Rethinking Model Scaling for Convolutional Neural Networks", arxiv preprint arxiv:1905. 11946,2019.

https://pytorch.org/blog/introduction-to-quantization-on-pytorch.

Milos Manic et al., Random weights search in compressed neural networks using overdetermined pseudoinverse, 2003 IEEE International Symposium on Industrial Electronics, Mar. 3, 2004, p. 678-683.

SUN Jianhui et al, Mixed-precision quantization technology of convolutional neural networks, Information Technology, 2020,44(06): 66-69. DOI:10.13274/j.cnki.hdzj.2020.06.015. p. 66-69.

The Search Report for the counterpart Chinese patent application 202011308961.0, mailed on Feb. 27, 2025.

The Search Report for the counterpart Chinese patent application 202011308961.0, mailed on Aug. 29, 2025.

* cited by examiner

METHOD AND DEVICE FOR COMPRESSING NEURAL NETWORK

CROSS REFERENCE TO RELATED APPLICATIONS

This application claims priority to Chinese patent application No. 202011308961.0 filed on Nov. 20, 2020, the entire content of which is incorporated herein by reference.

TECHNICAL HELD

This application relates to the field of neural network, and in particular, to a method and a device for compressing a neural network.

BACKGROUND

Nowadays, neural networks have been widely used in many technical fields, such as image recognition, voice recognition, autonomous driving, and medical imaging. For example, convolutional neural network (CNN) is a representative network structure and algorithm of the neural network technology, and has achieved great success in the image processing application. However, the neural network has too many computation layers and parameters, which take up a large amount of storage and computing resources, thereby limiting its application on a hardware platform with limited resources (for example, an embedded system).

SUMMARY

An objective of the present application is to provide a method for compressing a neural network, which can obtain a higher compression ratio with less accuracy loss.

In an aspect of the application, a method for compressing a neural network is provided. The method may include: obtaining an original neural network to be compressed, the original neural network including J operation layers to be compressed, where J is an integer greater than 1; compressing a $j^{th}$ operation layer of the J operation layers with $K_j$ different compression ratios to generate $K_j$ operation branches, where j and $K_j$ are integers, $1 \le j \le J$, and $K_j \ge 1$; obtaining, for the $j^{th}$ operation layer, a set of $K_j$ weighting factors corresponding to the respective $K_j$ operation branches, where the $K_j$ weighting factors have respective initial values; replacing the $j^{th}$ operation layer with the $K_j$ operation branches weighted by the set of $K_j$ weighting factors, to generate a replacement neural network; performing forward propagation to the replacement neural network based on a preset dataset, where a weighted sum operation is performed on $K_j$ operation results generated by the $K_j$ operation branches with the $K_j$ weighting factors and a result of the weighted sum operation is used as an output of the $j^{th}$ operation layer; performing backward propagation to the replacement neural network based on the preset dataset, where, for the $j^{th}$ operation layer, updated values of the $K_j$ weighting factors are calculated based on a model loss of the replacement neural network relative to the original neural network; and determining, for the $j^{th}$ operation layer, an operation branch corresponding to a maximum value of the updated values of the $K_j$ weighting factors as a compressed $j^{th}$ operation layer.

In another aspect of the application, a device for compressing a neural network is provided. The device may include: a processor; and a memory, wherein the memory stores program instructions that are executable by the processor, and when executed by the processor, the program instructions cause the processor to perform: obtaining an original neural network to be compressed, the original neural network including J operation layers to be compressed, where J is an integer greater than 1; compressing at $j^{th}$ operation layer of the J operation layers with $K_j$ different compression ratios to generate $K_j$ operation branches, where j and $K_j$ are integers, $1 \le j \le J$, and $K_j \ge 1$; obtaining, for the $j^{th}$ operation layer, a set of $K_j$ weighting factors corresponding to the respective $K_j$ operation branches, where the $K_j$ weighting factors have respective initial values; replacing the $j^{th}$ operation layer with the $K_j$ operation branches weighted by the set of $K_j$ weighting factors, to generate a replacement neural network; performing forward propagation to the replacement neural network based on a preset dataset, where a weighted sum operation is performed on $K_j$ operation results generated by the $K_j$ operation branches with the $K_j$ weighting factors and a result of the weighted sum operation is used as an output of the $j^{th}$ operation layer; performing backward propagation to the replacement neural network based on the preset dataset, where, for the $j^{th}$ operation layer, updated values of the $K_j$ weighting factors are calculated based on a model loss of the replacement neural network relative to the original neural network; and determining, for the $j^{th}$ operation layer, an operation branch corresponding to a maximum value of the updated values of the $K_j$ weighting factors as a compressed $j^{th}$ operation layer.

In another aspect of the application, a non-transitory computer-readable storage medium is provided. The non-transitory computer-readable storage medium has stored therein instructions that, when executed by a processor, cause the processor to perform a method for compressing a neural network, the method including: obtaining an original neural network to be compressed, the original neural network including J operation layers to be compressed, where J is an integer greater than 1; compressing a $j^{th}$ operation layer of the J operation layers with $K_j$ different compression ratios to generate $K_j$ operation branches, where j and $K_j$ are integers, $1 \le j \le J$, and $K_j \ge 1$; obtaining, for the $j^{th}$ operation layer, a set of $K_j$ weighting factors corresponding to the respective $K_j$ operation branches, where the $K_j$ weighting factors have respective initial values; replacing the $j^{th}$ operation layer with the $K_j$ operation branches weighted by the set of $K_j$ weighting factors, to generate a replacement neural network; performing forward propagation to the replacement neural network based on a preset dataset, where a weighted sum operation is performed on $K_j$ operation results generated by the $K_j$ operation branches with the $K_j$ weighting factors and a result of the weighted sum operation is used as an output of the $j^{th}$ operation layer; performing backward propagation to the replacement neural network based on the preset dataset, where, for the $j^{th}$ operation layer, updated values of the $K_j$ weighting factors are calculated based on a model loss of the replacement neural network relative to the original neural network; and determining, for $j^{th}$ operation layer, an operation branch corresponding to a maximum value of the updated values of the $K_j$ weighting factors as a compressed $j^{th}$ operation layer.

In still another aspect of the application, a device for compressing a neural network is provided. The device may include a first obtaining unit, a compressing unit, a second obtaining unit, a replacing unit, a forward propagation unit, a backward propagation unit, and a determining unit. The first obtaining unit is configured for obtaining an original neural network to be compressed, the original neural network including J operation layers to be compressed, where J is an integer greater than 1. The compressing unit is configured for compressing a $j^{th}$ operation layer of the J operation layers with $K_j$ different compression ratios to generate $K_j$ operation branches, where j and $K_j$ are integers, $1 \leq j \leq J$, and $K_j \geq 1$. The second obtaining unit is configured for obtaining, for the $j^{th}$ operation layer, a set of $K_j$ weighting factors corresponding to the respective $K_j$ operation branches, where the $K_j$ weighting factors have respective initial values. The replacing unit is configured for replacing the $j^{th}$ operation layer with the $K_j$ operation branches weighted by the set of $K_j$ weighting factors, to generate a replacement neural network. The forward propagation unit is configured for performing forward propagation to the replacement neural network based on a preset dataset, where a weighted sum operation is performed on $K_j$ operation results generated by the $K_j$ operation branches with the $K_j$ weighting factors and a result of the weighted sum operation is used as an output of $j^{th}$ operation layer. The backward propagation unit is configured for performing backward propagation to the replacement neural network based on the preset dataset, where, for the $j^{th}$ operation layer, updated values of the $K_j$ weighting factors are calculated based on a model loss of the replacement neural network relative to the original neural network. The determining unit is configured for determining, for the $j^{th}$ operation layer, an operation branch corresponding to a maximum value of the updated values of the $K_j$ weighting factors as a compressed $j^{th}$ operation layer.

The foregoing is a summary of the present application and may be simplified, summarized, or omitted in detail, so that a person skilled in the art shall recognize that this section is merely illustrative and is not intended to limit the scope of the application in any way. This summary is neither intended to define key features or essential features of the claimed subject matter, nor intended to be used as an aid in determining the scope of the claimed subject matter.

BRIEF DESCRIPTION OF THE DRAWINGS

The abovementioned and other features of the present application will be more fully understood from the following specification and the appended claims, taken in conjunction with the drawings. It can be understood that these drawings depict several embodiments of the present application and therefore should not be considered as limiting the scope of the present application. By applying the drawings, the present application will be described more clearly and in detail.

DETAILED DESCRIPTION

Figure 1:
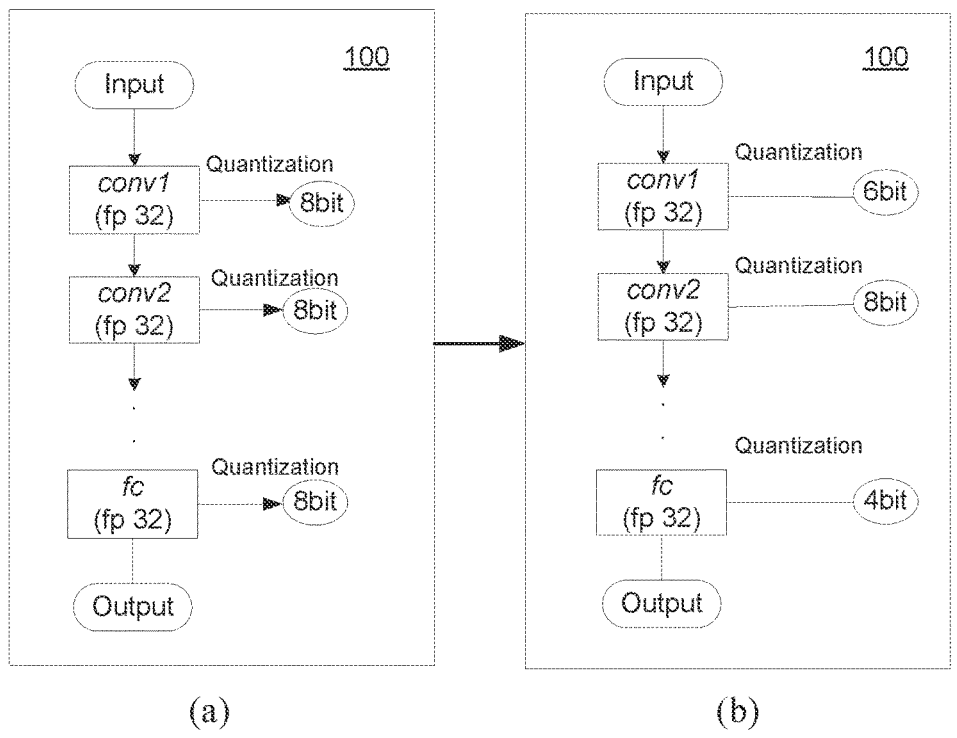
FIG. 1(a) and FIG. 1(b) illustrate schematic diagrams of a uniform quantization scheme and a hybrid quantization scheme, respectively.

The following detailed description refers to the drawings that form a part hereof. In the drawings, similar symbols generally identify similar components, unless context dictates otherwise. The illustrative embodiments described in the description, drawings, and claims are not intended to limit. Other embodiments may be utilized and other changes may be made without departing from the spirit or scope of the subject matter of the present application. It can be understood that numerous different configurations, alternatives, combinations and designs may be made to various aspects of the present application which are generally described and illustrated in the drawings in the application, and that all of which are expressly formed as part of the application.

In order to facilitate deployment of a neural network on hardware, neural networks are usually compressed, such as being pruned and quantized. Specifically, quantization refers to the use of low bit-width binary numbers instead of high bit-width binary numbers to represent parameter values in the neural network, thereby compressing the neural network. In a typical neural network quantization method, the parameter values used in all operation layers of the neural network are quantized to a uniform bit-width. Referring to an example shown in FIG. 1(a), before quantization, parameter values of convolutional layers (for example, conv1, conv2, etc.) and a fully connected layer (for example, fc) in a neural network 100 are all represented by 32-bit floating-point numbers (fp 32); while, after quantization, these parameter values are represented by 8-bit fixed-point numbers. In other examples, more-bit numbers or less-bit numbers (that is, with higher or lower accuracy) can also be used to quantize the parameter values used in various operation layers of the neural network. It should be noted that the accuracy loss caused by quantizing the parameter values of the neural network is usually related to the quantization accuracy. For example, if the parameter values used in the neural network are uniformly quantized from 32-bit floating-point numbers to 8-bit fixed-point numbers or 4-bit fixed-point numbers, the accuracy loss of quantization to 4-bit numbers may be significantly higher than that of quantization to 8-bit numbers.

The inventors of the present application have found that, in prior art, all operation layers in the neural network are usually quantized with the same quantization accuracy, but sensitivities of different operation layers to the quantization accuracy is not the same. For example, quantization of some operation layers to 8 bits may cause a large accuracy loss of the neural network, while an accuracy loss of quantizing some other operation layers to even 4 bits may be within an acceptable range. In view of this, a hybrid quantization solution is provided in this application, which may use different quantization accuracies for different operation layers. For example, as shown in FIG. 1(b), before quantization, the convolutional layers and the fully connected layer in the neural network 100 all use 32-bit floating-point numbers to represent parameter values. However, after quantization, the second convolutional layer conv2, which is sensitive to quantization, uses higher-accuracy 8-bit fixed-point numbers to represent its parameter values; the fully connected layer fc, which is not sensitive to quantization, uses lower-accuracy 4-bit fixed-point numbers to represent its parameter values; and the first convolutional layer conv1, which has a middle-level sensitivity to quantization, uses 6-bit fixed-point numbers to represent its parameter values. This solution that adaptively adjusts the quantization accuracy based on the quantization sensitivity of different operation layers can achieve a higher compression ratio with less accuracy loss. Furthermore, in view of the tradeoff between the compression ratio and the accuracy loss of the neural network, the present application creatively solved the problem of how to reasonably allocate different quantization accuracies among multiple operation layers. For example, for a neural network with 50 operation layers, if there are 4 different quantization accuracies for each layer, there are $4^{50}$ different quantization schemes for the neural network. Thus, due to the large amount of calculation, it is obviously not feasible to find the best quantization scheme from the $4^{50}$ different quantization schemes through brute force search.

In view of the above, the present application provides a method for compressing a neural network. In this method, after obtaining an original neural network, operation layers to be compressed in the neural network are compressed with a plurality of different compression ratios to generate one or more operation branches corresponding to each operation layer to be compressed. Then, one or more weighting factors corresponding to the one or more operation branches are generated for each operation layer, and the neural network is retrained based on a preset dataset, including performing forward propagation and backward propagation to the neural network. In the forward propagation process, for each operation layer, the one or more operation branches are used to replace the operation layer, and a weighted sum operation is performed on one or more operation results generated by the one or more operation branches with the one or more weighting factors and the result of the weighted sum operation is used as an output of the operation layer. In the backward propagation process, updated values of the one or more weighting factors are calculated based on a model loss of the neural network. Then, for each operation layer, an operation branch corresponding to the maximum value of the updated values of the one or more weighting factors is determined as a compressed operation layer, so as to form a compressed neural network. By introducing the weighting factors, the method can retrain the neural network based on a small dataset of training samples, update the weighting factors based on the model loss, and select the operation branch corresponding to the largest weighting factor in each operation layer as the compressed operation layer. Therefore, a suitable compression ratio (or quantization accuracy) that can take into account the accuracy of the neural network is selected for the operation layers. Compared with the aforementioned brute force search, the method of the present application reduces the amount of calculation significantly.

Figure 2:
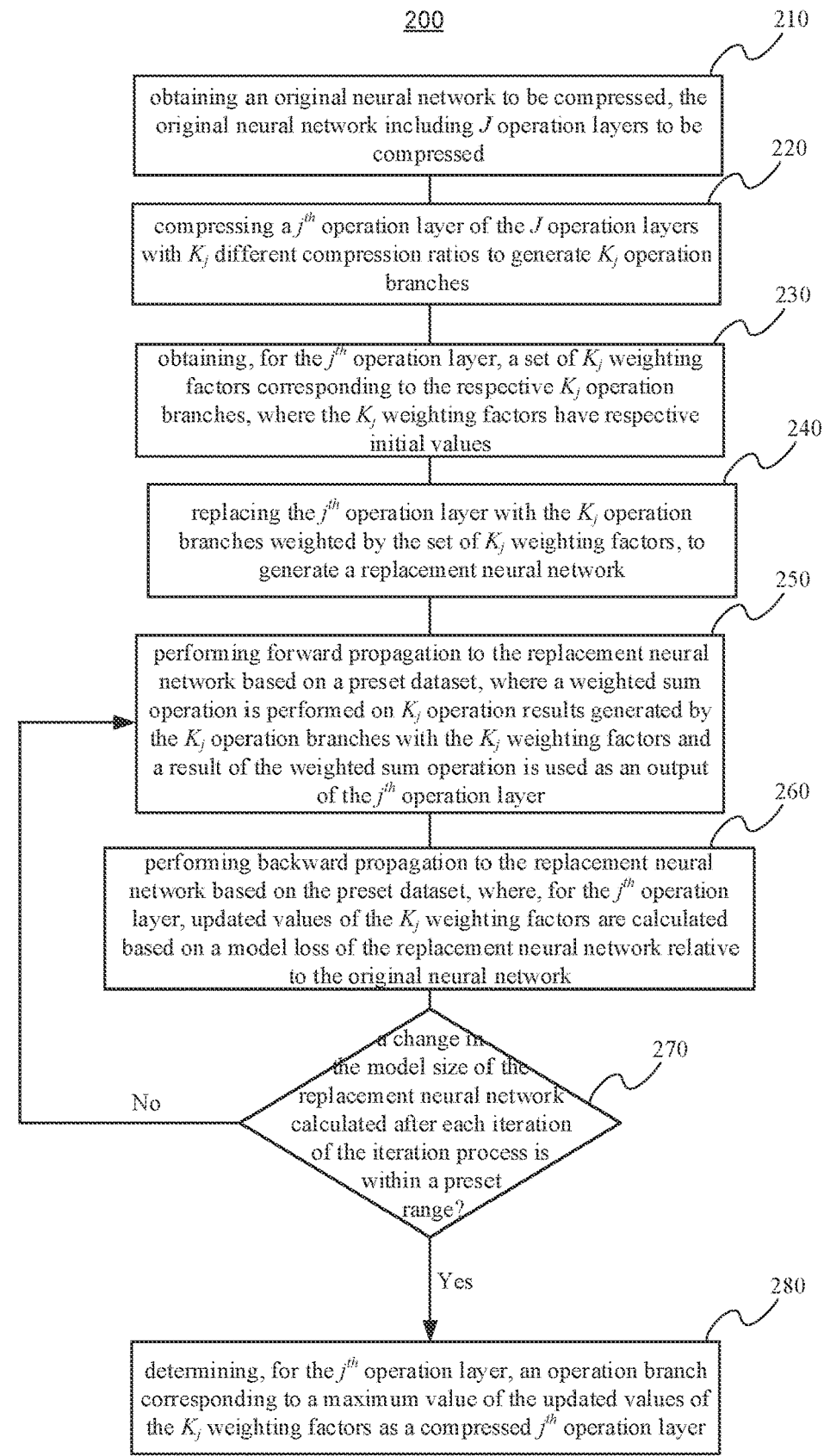
FIG. 2 illustrates a flowchart of a method for compressing a neural network according to an embodiment of the present application.

The method for compressing a neural network of the present application will be described in detail below with reference to the drawings. FIG. 2 illustrates a flowchart of a method 200 for compressing a neural network according to an embodiment of the present application, which specifically includes the following blocks 210-280.

In block 210, an original neural network is obtained, where the original neural network includes J operation layers to be compressed, and J is an integer greater than 1.

The original neural network may be a deep neural network (DNN) obtained after being trained on a dataset of training samples, such as a convolutional neural network (CNN), a recurrent neural network (RNN), a deep belief network (DBN), a restricted Boltzmann machine (RBM), a fully connected network (FCN), a deep convolutional network (DCN), a long short-term memory (LSTM) network, or a gated recurrent unit (GRU).

Figure 3:
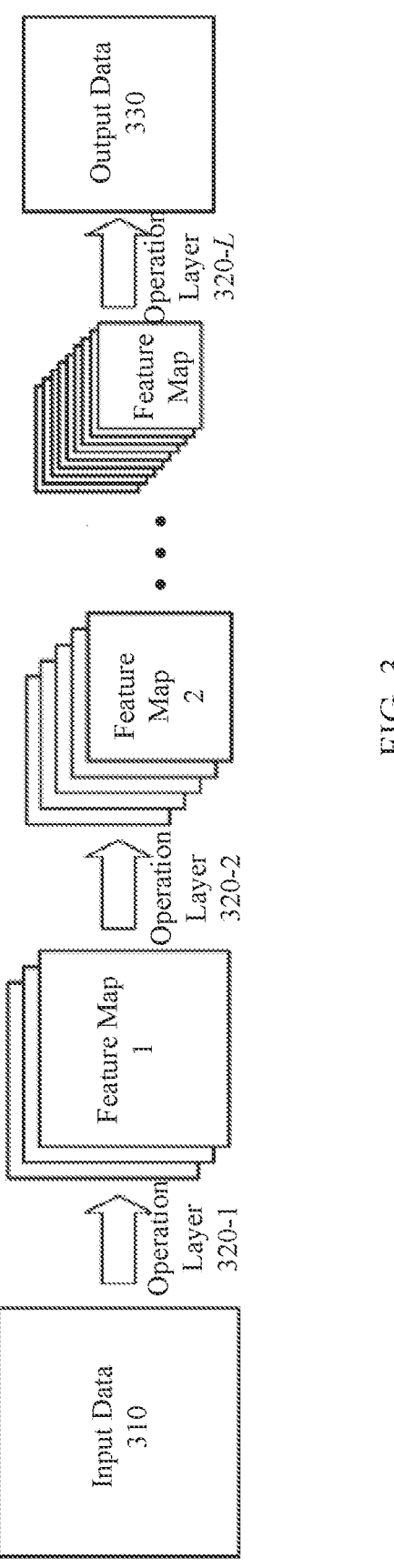
FIG. 3 illustrates a schematic diagram of an exemplary neural network.

FIG. 3 illustrates a schematic diagram of an exemplary original neural network. The original neural network which is to be compressed includes a plurality of operation layers 320-1, 320-2, . . . , 320-L for sequentially processing input data 310 received by the neural network, and outputting output data 330. In some embodiments, the original neural network may be a convolutional neural network, such as LeNet, AlexNet, VGGNet, GoogLeNet, ResNet, or other types of convolutional neural networks. The plurality of operation layers may include convolutional (Conv) layers, batch normalization (BN) layer, activation layer (for example, ReLU layer), pooling layer or fully connected layer, etc. Different operation layers may include different types or numbers of parameters used in the operation of the original neural network. For example, the convolutional layer can include a plurality of filters. Each filter may include a plurality of convolution kernels, and each convolution kernel may include a plurality of weighting values arranged in an array (for example, a matrix with 3×3, 5×5, or 7×7 weighting values). These weighting values are used as parameter values of the convolutional layer to be used in the operation of the original neural network. For image processing convolutional neural networks, the input data 310 may be an image represented by pixel matrixes including a plurality of different color channels (for example, R, G, and B color channels). The operation layer 320-1 may be a convolutional layer, which includes one or more filters to perform convolution operations on the input data 310 to generate a plurality of feature maps 1. Then, the feature maps 1 are used as input data of the next operation layer 320-2 (for example, a batch normalization layer, an activation layer, a pooling layer, or a fully connected layer) for further processing to generate a plurality of feature maps 2. Some other operation layers perform their respective operations similarly until the processing layer 320-L generates output data 330, where L may be an integer greater than 1. Depending on the application type of the convolutional neural network, the output data 330 may change. For example, in an image classification neural network, the output data 330 may indicate that objects in the input image can be classified into a plurality of different classification types. Also, in an image detection network, the output data 330 may represent a detection result of an object in the input image. In other embodiments, the input data 310 and the output data 330 may be voice data, text data, etc., depending on the specific application scenarios of the convolutional neural network. It should be noted that, although the above embodiments are described by taking a convolutional neural network as an example, it could be appreciated that the method for compressing a neural network in the present application can be applied to any neural network that includes at least an operation layer to be compressed.

In some embodiments, all the operation layers in the original neural network may be operation layers to be compressed, that is, the number of operation layers to be compressed J is equal to a total number of the operation layers (for example, for FIG. 3, J=L). In some embodiments, the original neural network may include operation layers that do not require compression. In other words, the number J of the operation layers to be compressed may be less than the total number of the operation layers (for example, for FIG. 3, J<L). It may vary based on the feature of the original neural network or specific application requirements whether to compress all the operation layers in the original neural network, or which operation layers are to be selected for compression.

In block 220, the $j^{th}$ operation layer to be compressed among the J operation layers is compressed with $K_j$ different compression ratios to generate $K_j$ operation branches, respectively, where j and $K_j$ are integers, $1 \le j \le J$, and $K_j \ge 1$.

In order to improve the accuracy of calculation, parameters of the operation layers to be compressed of the original neural network obtained in block 210 are usually represented by high-accuracy numbers, such as floating-point numbers with a high bit-width. In some examples, 32-bit floating-point numbers may be used to represent the parameters of the operation layer to be compressed. Taking a convolution layer to be compressed with 5×5 convolution kernels as an example, the 25 weighting values (i.e., parameters) in each convolution kernel are represented by 32-bit floating-point numbers. Therefore, an effective method for compressing the original neural network is to replace the high bit-width parameters in the operation layer of the neural network with low bit-width parameters.

In some embodiments, the J operation layers of the original neural network may be compressed with the same number of compression ratios, that is, the numbers of compression ratios $K_1$, $K_2$, . . . , and $K_J$ respectively used by the J operation layers to be compressed may be equal to each other. In some embodiments, the numbers of compression ratios $K_1$, $K_2$, . . . , and $K_J$ respectively used by the J operation layers to be compressed may be different, or a part of the compression ratios are equal to each other. The number of compression ratios used by each operation layer to be compressed can be determined based on a sensitivity of the operation layer to compression ratio, or a target compression ratio for the neural network.

In some embodiments, parameters of the $j^{th}$ operation layer to be compressed of the original neural network are represented by $N_{0j}$-bit binary numbers. After the operation layer is compressed with the $K_j$ different compression ratios to generate $K_j$ operation branches, the parameter values of these $K_j$ operation branches are represented by $N_{1j}$-bit, $N_{2j}$-bit, . . . , $N_{K_j}{}^j$-bit binary numbers respectively, where $K_j$ is an integer greater than or equal to 1, $N_{0j}$, $N_{1j}$, $N_{2j}$, . . . , $N_{K_j}{}^j$ are integers greater than or equal to 1, and $N_{1j}$, $N_{2j}$, . . . , $N_{K_j}{}^j$ are less than or equal to $N_{0j}$. Specifically, the different operation branches corresponding to an operation layer to be compressed may have the same size and structure as this operation layer to be compressed, but the parameters of the operation branches may have accuracies different from the corresponding parameters in the original operation layer. It should be noted that the number of operation branches $K_j$ may also be determined based on the hardware platform for deploying the original neural network. If the hardware platform only supports calculation of binary numbers of $K_j$ different bit-widths, at most $K_j$ operation branches can be generated for each operation layer to be compressed.

In an example, the parameters of the $j^{th}$ operation layer to be compressed of the original neural network may be represented by 32-bit floating-point numbers (fp 32), and the operation layer to be compressed may be compressed with 4 different compression ratios (i.e., $K_j$=4) to generate 4 operation branches. Parameters of the 4 operation branches are represented by 16-bit floating-point numbers (fp 16), 8-bit fixed-point numbers (int 8), 6-bit fixed-point numbers (int 6), and 4-bit fixed-point numbers (int 4), respectively. After compression, data sizes of the parameters of the 4 operation branches are reduced to 50%, 25%, 18.75%, and 12.5% of the data size of the original operation layer, respectively. It should be noted that the bit-widths of parameters and the numbers of operation branches above are only exemplary. In other examples, the parameters of the operation layer to be compressed and the operation branches generated after compression may be represented by higher or lower bit-width numbers, for example, eight-accuracy floating-point numbers (fp 256), four-accuracy floating-point numbers (fp 128), double-accuracy floating-point numbers (fp 64), 2-bit fixed-point numbers (int 2), 1-bit fixed-point numbers (int 1), and the number of operation branches may be greater than or less than 4.

In some embodiments, each parameter of the operation layer to be compressed can be compressed according to the following Equation (1):

$$r = S(q - Z) \tag{1}$$

In Equation (1), r represents a parameter of the operation layer to be compressed, q represents a parameter after compression, a constant S represents the compression scale, and a constant Z represents the zeropoint value. For example, if the smallest parameter among all the parameters in a certain operation layer to be compressed is a, the largest parameter is b, and the compressed parameter is represented by an 8-bit fixed-point number in the range [−127, 128], then, Z=(b−a)/2, and S=(b−a)/256. That is, for a certain operation layer to be compressed and a certain compression accuracy, the constants S and Z are fixed. For example, after the calculation with Equation (1), the parameter r represented by a 32-bit floating-point number in the operation layer to be compressed can be mapped to a parameter q represented by an 8-bit fixed-point number in the range of [−127, 128].

In block 230, a set of $K_j$ weighting factors corresponding to the respective $K_j$ operation branches are obtained for the $j^{th}$ operation layer to be compressed, where the $K_j$ weighting factors have respective initial values.

In some embodiments, the initial values of the weighting factors may be automatically generated by software. In other embodiments, the initial values of the weighting factors may be predetermined and provided by a user. Since the sensitivity of each operation layer to the compression ratio is unknown before the neural network is retrained, in a preferred embodiment, the initial values of the $K_j$ weighting factors corresponding to the respective $K_j$ operation branches, which represent different compression ratio, are set to be equal to each other.

For the foregoing example of 32-bit floating-point number parameters, 16-bit floating-point numbers, 8-bit fixed-point numbers, 6-bit fixed-point numbers, and 4-bit fixed-point numbers may be used to represent compressed parameters of the 4 operation branches respectively, and the 4 corresponding weighting factors may be represented by $\beta_1$, $\beta_2$, $\beta_3$, and $\beta_4$, respectively. In an embodiment, initial values of these 4 weighting factors may be set to zero. It could be appreciated that, in other examples, the initial values of the weighting factors can also be set to other equal or unequal values.

In block 240, for the $j^{th}$ operation layer to be compressed, the operation layer to be compressed is replaced with the $K_j$ operation branches weighted by the set of $K_j$ weighting factors to generate a replacement neural network.

Figure 4:
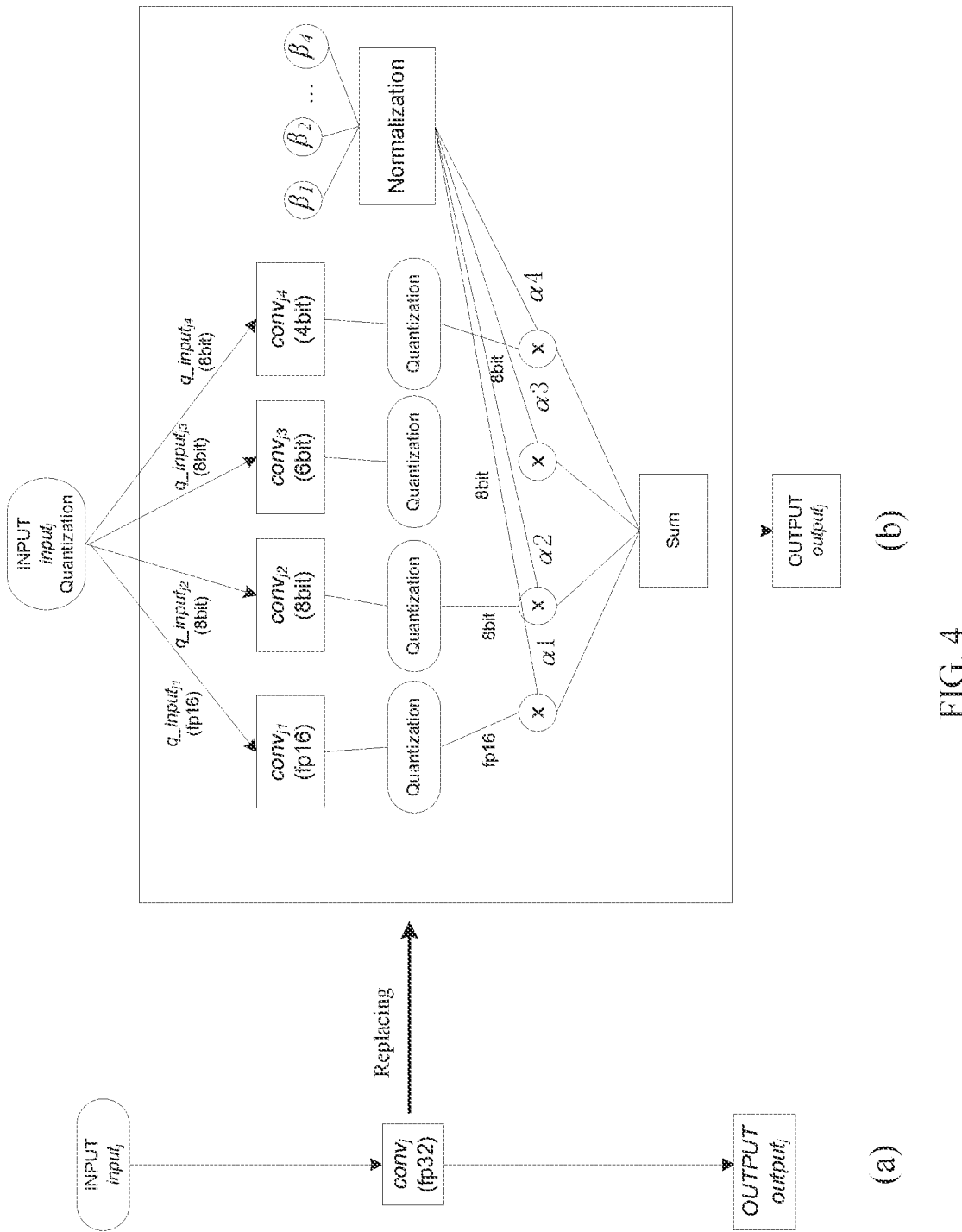
FIG. 4(a) and FIG. 4(b) illustrate block diagrams of forward propagation to an operation layer of a neural network according to an embodiment of the present application.

Referring to FIG. 4(*a*) and FIG. 4(*b*), the $j^{th}$ operation layer (i.e., the convolutional layer $conv_j$) of the original neural network is taken as an example. Assuming that 4 different compression ratios are used to compress the $j^{th}$ in operation layer and 4 operation branches $conv_{j1}$, $conv_{j2}$, $conv_{j3}$ and $conv_{j4}$ are generated, the $j^{th}$ operation layer $conv_j$ is replaced with the 4 operation branches weighted by the 4 weighting factors ($\beta_1$, $\beta_2$, $\beta_3$ and $\beta_4$), i.e., $\beta_1 \text{conv}_{j1}$, $\beta_2 \text{conv}_{j2}$, $\beta_3 \text{conv}_{j3}$ and $\beta_4 \text{conv}_{j4}$. After completing the above replacement operation for all the J operation layers to be compressed, a replacement neural network is generated.

Although the foregoing description has been made by taking the operation layer being a convolutional layer as an example, it could be appreciated that similar replacement operations can also be implemented for a batch normalization layer, an activation layer, or a fully connected layer.

In block 250, forward propagation to the replacement neural network is performed based on a preset dataset, where a weighted sum operation is performed on the $K_j$ operation results generated by the $K_j$ operation branches with the $K_j$ weighting factors and a result of the weighted sum operation is used as an output of the $j^{th}$ operation layer.

In some embodiments, the preset dataset may be a dataset different from the above dataset of training samples which are used to train the neural network. The preset dataset may include a plurality of training samples, and each sample includes an input object and an expected output value. The forward propagation to the neural network based on the preset dataset can generate an output value for the input object of each sample. By comparing the output value with the expected output value, the accuracy of the neural network can be evaluated. For example, for an image classification network, the input object is an image, the output of forward propagation indicates that objects in the input image is classified into a plurality of different classification types. Based on the comparison between the classification types indicated by the output with the expected classification types, the parameters of the image classification network can be adjusted and the performance of the image classification network can be evaluated. Similarly, if the neural network is used in a speech recognition system, the input object is a speech sample, and the expected output is a corresponding text. In some examples, the above preset dataset may be an ImageNet dataset, a CIFAR10 dataset, or the like. It could be appreciated that those skilled in the art could select any suitable dataset for retraining the neural network according to specific applications, which will not be elaborated herein.

Continuing to FIG. 4(a) and FIG. 4(b), the forward propagation to the replacement neural network is further described by replacing the operation layer $\text{conv}_j$ with four operation branches $\text{conv}_{j1}$, $\text{conv}_{j2}$, $\text{conv}_{j3}$ and $\text{conv}_{j4}$ as an example. Specifically, FIG. 4(a) illustrates a normal forward propagation process to the $j^{th}$ operation layer $\text{conv}_j$, and FIG. 4(b) illustrates the forward propagation to the four operation branches $\text{conv}_{j1}$, $\text{conv}_{j2}$, $\text{conv}_{j3}$ and $\text{conv}_{j4}$ (i.e., $K_j=4$) which replace the $j^{th}$ operation layer $\text{conv}_j$.

First, for the operation layer $\text{conv}_j$, the input data may be compressed before the forward propagation to generate $K_j$ compressed input data corresponding to the $K_j$ operation branches respectively, where the accuracies of the $K_j$ compressed input data correspond to accuracies of the parameter values of the $K_j$ operation branches respectively. For example, the input data may be quantized to generate the $K_j$ compressed input data, and the bit-widths of the $K_j$ compressed input data are equal to or similar to bit-widths of the parameters of the $K_j$ operation branches, respectively.

In some embodiments, the compression of the input data can be expressed by Equation (2):

$$q\_input_{jk} = quantize_k(input_j) \qquad (2)$$

In Equation (2), $input_j$ represents the input data of the $j^{th}$ operation layer to be compressed, the operator "$quantize_k$" represents a quantizer corresponding to the $k^{th}$ operation branch of the $K_j$ operation branches ( k=1, 2, . . . , $k_j$), and $q\_input_{jk}$ represents the quantized input data corresponding to the $k^{th}$ operation branch of the $j^{th}$ operation layer. When $K_j=4$ as shown in FIG. 4(b), the input data $input_j$ of $j^{th}$ operation layer $\text{conv}_j$ is quantized to generate 4 quantized input data $q\_input_{j1}$, $q\_input_{j2}$, $q\_input_{j3}$ and $q\_input_{j4}$ respectively corresponding to the 4 operation branches $\text{conv}_{j1}$, $\text{conv}_{j2}$, $\text{conv}_{j3}$ and $\text{conv}_{j4}$. The 4 quantized input data are represented by 16-bit floating-point numbers (fp 16), 8-bit fixed-point numbers (int 8), 8-bit fixed-point numbers (int 8) and 8-bit fixed-point numbers (int 8), respectively. By quantizing the input data, not only the storage space of the neural network model can be saved, but also the calculation process between the quantized input data and the operation branches can be accelerated. For example, the convolution operation of the quantized input data and the operation branches can be changed from multiplication and addition operations to floating-point numbers to multiplication and addition operations to integers. It should be noted that the bit-width of the quantized input data is not limited to the above example, which can be adjusted based on calculation accuracy requirements in specific applications. Referring to FIG. 3, it could be appreciated that, when the $j^{th}$ operation layer $\text{conv}_j$ is the first operation layer to be compressed, the input data $input_j$ is the input data 310 shown in FIG. 3; and when the $j^{th}$ a operation layer is another operation layer except for the first operation layer to be compressed, the input data $input_j$ is the output data of the $(j-1)^{th}$ operation layer to be compressed.

Next, certain operations may be performed on the $K_j$ replaced operation branches and the $K_j$ quantized input data to generate operation results corresponding to the $K_j$ operation branches. A weighted sum operation may be performed on the $K_j$ operation results with the corresponding $K_j$ weighting factors to generate a summation, and the summation may be used as an output result of this operation layer. Taking the $j^{th}$ operation layer being a convolutional layer $\text{conv}_j$ as an example, the above operation and weighting steps can be given by Equation (3):

$$output_j = \sum_{k=1}^{K_j} \alpha_{jk} * quantize_k(conv_k \circ q\_input_{jk}) \qquad (3)$$

In Equation (3), "$conv_{jk} \circ q\_input_{jk}$" represents a convolution operation performed on the $k^{th}$ convolution branch $conv_{jk}$ in the $j^{th}$ operation layer and the $k^{th}$ quantized input data $q\_input_{jk}$, the operator "$quantize_k$" represents a quantization operation performed on the convolution result of the $k^{th}$ convolution branch, and $\alpha_{jk}$ is a normalized representation of the weighting factor $\beta_{jk}$, which represents the $k^{th}$ normalized weighting factor in the $j^{th}$ operation layer. In some examples, the normalization of the weighting factor $\beta_{jk}$ can be performed by using the following "softmax" function, that is, the following Equation (4):

$$\alpha_{jk} = \frac{e^{\beta_{jk}}}{\sum\limits_{k=1}^{K_j} e^{\beta_{jk}}} \quad (k = 1, 2, \ldots , K_j) \qquad (4)$$

It could be appreciated that those skilled in the art can understand that the weighting factor $\beta_{jk}$ can also be normalized by using other functions according to specific applications. Continuing to taking FIG. 4(*b*) as an example, when $K_j=4$, the above Equation (3) can be expressed as the following Equation (5):

$$\text{output}_j = \tag{5}$$
$$\alpha_{j1} * \text{quantize}_1(conv_{j1} \circ \text{q\_input}_{j1}) + \alpha_{j2} * \text{quantize}_2(conv_{j2} \circ \text{q\_input}_{j2}) +$$
$$\alpha_{j3} * \text{quantize}_3(conv_{j3} \circ \text{q\_input}_{j3}) + \alpha_{j4} * \text{quantize}_4(conv_{j4} \circ \text{q\_input}_{j4})$$

The specific operation process will not be elaborated herein.

It should be noted that, the operation layer to be compressed is taken as a convolutional layer for description in the example of FIG. 4, but it could be appreciated that the forward propagation to the activation layer, the fully connected layer and the like can be performed in a similar manner. Moreover, in some embodiments, a plurality of operation layers of the original neural network may be optimized and combined to form a network block, and then the network block can be used as a unit for compression and forward propagation. For example, by referring to operational relationships and data of each operation layer to be compressed in the neural network, and extracting the relationships between adjacent operation layers to be compressed, two or more operation layers to be compressed may be combined to form a network block for further processing, so as to reduce undesired intermediate output and improve operation efficiency. For example, the convolutional layer and the activation layer are very common in convolutional neural networks and always appear in pairs, and thus the convolutional layer and the activation layer may be combined to form a network block (Conv+ReLU), which as a whole may be used as an operation layer or unit to be compressed for subsequent operations. In other examples, the convolutional layer may be combined with the pooling layer (Conv+Pooling), the convolutional layer may be combined with the batch normalization layer and the activation layer (Conv+BN+ReLU), and so on.

It should also be noted that, although the process of forward propagation is described above by taking the compression of input data as an example, in other embodiments, the input data may not be compressed, and the original input data is used for the operation with the operation branches.

In block 260, the backward propagation to the replacement neural network is performed based on the preset dataset, where, for the $j^{th}$ operation layer to be compressed, updated values of the $K_j$ weighting factors are calculated based on a model loss of the replacement neural network relative to the original neural network.

As described above, compressing the parameters of the original neural network (for example, replacing higher bit-width parameters with lower bit-width parameters) may result in a loss of accuracy of the original neural network, while computing resources may be saved. Therefore, the replacement neural network can be backward-propagated to adjust its parameters, and reduce its accuracy loss. It should be noted that, when performing backward propagation to the replacement neural network, the technical solution of the present application only adjusts and updates weighting factors of each operation layer to be compressed, but does not adjust other parameters of the neural network (for example, weighting values of the convolutional layer).

In some embodiments, when performing backward propagation to the replacement neural network, the $K_j$ weighting factors of the $j^{th}$ operation layer to be compressed can be updated according to the following Equation (6):

$$\beta'_{jk} = \beta_{jk} - \lambda \frac{\partial \text{Loss}}{\partial \beta_{jk}}, (k = 1, \dots, K_j) \tag{6}$$

In Equation (6), $\beta_{jk}$ represents an initial value of the $k^{th}$ weighting factor of the $j^{th}$ operation layer, $\beta'_{jk}$ represents an updated value of the $k^{th}$ weighting factor of the $j^{th}$ operation layer, Loss represents a model loss function of the replacement neural network relative to the original neural network, and $\lambda$ represents a learning rate and can be defined by the user.

In some embodiments, the model loss function Loss includes a loss function part and a performance index term. Specifically, the loss function part is related to an application type of the neural network, such as classification, positioning, detection or segmentation. The performance index part is related to a hardware index of the hardware platform on which the neural network is to be deployed, such as a storage space, a number of floating-point operations, a delay time or a power consumption, etc.

The following takes the compression of a storage space of a classification neural network on the hardware platform as an example to illustrate the model loss function Loss. Specifically, the model loss function Loss can be given by the following Equation (7):

$$\text{Loss} = \text{loss1} * \text{loss2} \tag{7}$$

In Equation (7), loss1 represents a loss function part, and loss2 represents a performance index part.

For the classification neural network, the loss function part loss1 can be further given by a cross-entropy function as shown in Equation (8):

$$loss1 = CrossEntropy(pred, \text{label}) = -\sum_{i}^{I} \text{label}(i)\log(pred(i)), \tag{8}$$
$$(i = 1, \dots, I)$$

In Equation (8), label represents a classification label, which is usually represented by a one-hot code; I represents a total dimension of the classification labels, for example, for the ImageNet dataset, the total dimension of the classification labels I is 1000; label (i) represents the $i^{th}$ classification label of all I classification labels, where if the $i^{th}$ classification is true, label (i) is 1, otherwise label (i) is 0; and, correspondingly, pred (i) represents a probability that the $i^{th}$ classification is true.

The performance index part loss2 can be further given by a model size function shown in Equation (9):

$$loss2 = (\text{model\_size} / \text{model\_ref})^{\gamma} \tag{9}$$

In Equation (9), model_size represents a model size of the neural network in training, whose unit is "bit". model_ref is a constant related to the neural network model, which is set to a number of bits of the model size of the neural network after quantization with a uniform quantization accuracy. For example, after the original neural network is uniformly quantized using 8-bit fixed-point numbers, model_ref equals to the total number of parameters of the original neural network multiplied by 8 bits. $\gamma$ is a hyper-parameter, which is used to balance the accuracy loss of the neural network model and the model size. When a neural network model with higher accuracy is required, the value of $\gamma$ can be set smaller, and when a smaller neural network model is required, the value of $\gamma$ can be set larger. That is, the value of $\gamma$ can be determined according to specific requirements. In some examples, the value of $\gamma$ ranges 0.05 to 5. More specifically, in some examples, the value of $\gamma$ ranges 0.25 to 0.5, which can balance the accuracy loss of the neural network model and the model size better.

In some embodiments, the model size model_size of the neural network in training in the above Equation (9) can be expressed by the following Equation (10):

$$\text{model\_size} = \sum_{j=1}^{J} \sum_{k=1}^{K_j} \alpha_{jk} * \text{size} (\text{conv}_{jk}) \tag{10}$$

In Equation (10), J represents the total number of operation layers to be compressed in the neural network. j represents a series number of each operation layer to be compressed, and $1 \leq j \leq J$. $K_j$ represents a total number of operational branches in the $j^{th}$ operation layer to be compressed, k represents a series number of the operational branch in this operation layer, and $1 \leq k \leq K_j$. $\text{conv}_{jk}$ represents a convolutional layer of the $k^{th}$ operational branch in the $j^{th}$ operation layer. size ($\text{conv}_{jk}$) represents a number of bits of the convolutional layer $\text{conv}_{jk}$. Referring to the example shown in FIG. 4 (b), the values (i.e., size ($\text{conv}_{j1}$), size ($\text{conv}_{j2}$), size ($\text{conv}_{j3}$) and size ($\text{conv}_{j4}$)) corresponding to the 4 operation branches of the $j^{th}$ layer are equal to the numbers of weight values of respective operation branches multiplied by 16, 8, 6, and 4, respectively. In addition, $\alpha_{jk}$ represents a normalized weighting factor corresponding to the $k^{th}$ operation branch in the $j^{th}$ operation layer, which can be obtained by the above Equation (4).

The above example illustrates the model loss function Loss by taking the compression of a storage space of the classification neural network on the hardware platform as an example. It could be appreciated that, the model loss function Loss can be adjusted according to specific application scenarios. In some embodiments, the loss function part loss1 in the model loss function Loss may be adjusted according to the application type of the neural network (for example, classification, positioning, detection, segmentation, etc.). Taking image processing as an example, the classification neural network can be used to determine the classification of a given image; the positioning neural network can be used to determine a specific location of a target in the given image; the detection neural network can be used to identify and locate a target in a given image when a target type and number are uncertain; and the segmentation neural network can divide the given image into multiple components, which can be used to locate a boundary of the target in the image. Similar to the above-mentioned classification neural network, in which the loss function part loss1 is related to the classification labels and the probability of each recognized classification, when adjusting the loss function part loss1, the positioning neural network needs to consider the location parameters of the target in the image, the detection neural network needs not only to consider the type and number of targets, but also to consider positions of these targets in the image; and the segmentation neural network needs to consider the position and shape parameters of the target in the image. In some embodiments, according to the specific application type of the neural network, the loss function part loss1 may include one or more of a group consisting of the following: a cross-entropy function, an absolute value loss function, a logarithmic loss function, a square loss function, an exponential loss function, a hinge loss function, a perceptron function or other suitable loss functions. Correspondingly, the performance index part loss2 in the model loss function Loss can be adjusted according to the hardware index of the hardware platform to be deployed (for example, a storage space, a number of floating-point operations, a delay time or a power consumption, etc.). For example, if an index related to a number of floating-point operations, a delay time, or a power consumption of the compressed neural network is set for the hardware platform to be deployed, the model_size and model_ref parts related to the storage space in Equation (9) can be replaced with parameters related to the number of floating-point operations, the delay time or the power consumption, thereby forming the adjusted performance index part loss2.

In some embodiments, after block 260 is completed, the operation branch corresponding to the maximum value of the updated values of the $K_j$ weighting factors may be determined as the compressed $j^{th}$ operation layer, and accordingly the J operation layers to be compressed are replaced with J compressed operation layers, so as to obtain the compressed neural network. This can reduce the amount of calculations required to compress the neural network.

In the embodiment shown in FIG. 2, after block 260, the replacement neural network can be further retrained one or more times based on the preset dataset to obtain a compressed neural network with better performance.

In block 270, the forward propagation and the backward propagation to the replacement neural network are iteratively performed for multiple times based on the preset dataset. During the iteration process, a model size of the replacement neural network is calculated based on the operation branch corresponding to the maximum value of the updated values of the $K_j$ weighting factors, and it is determined whether a change in the model size of the replacement neural network calculated after each iteration of the iteration process is within a preset range. If the change is within the preset range, the method proceed with block 280. If the change is not within the preset range, the method 200 goes back to block 250, and continues to iteratively performing the forward propagation and backward propagation blocks.

An objective of retraining the replacement neural network based on the preset dataset (including forward propagation and backward propagation) is to update the $K_j$ weighting factors assigned to each operation layer to be compressed, so as to reach a tradeoff between the accuracy loss of the replacement neural network and the model size, to get an optimized hybrid quantization scheme. During the iteration process, for the $j^{th}$ operation layer to be compressed, the updated values of the $K_j$ weighting factors obtained in a backward propagation can be assigned to the $K_j$ weighting factors to be used in a forward propagation next to the backward propagation. After the forward propagation and backward propagation to the replacement neural network are iteratively performed for a plurality of times, if a change in the model size of the replacement neural network calculated after an iteration of the iteration process is within a preset range, it means that the training process tends to converge and can be ended; otherwise, it is desired to continue training the replacement neural network, and continue to perform the forward propagation and backward propagation to update the weighting factors.

It should be noted that, for the first operation of the forward propagation and backward propagation, since there is no previous iteration process, an initial model size of the original neural network can be used as the model size of the neural network before the first operation, and such initial model size can be used to calculate a change in the model size of the replacement neural network after the first operation of the forward propagation and backward propagation.

It should also be noted that, in some cases, there may be a situation where the retraining process does not converge. That is, the above change cannot converge within the preset range after multiple iterations. Thus, a maximum number of iterations can be preset. After the number of iterations reaches the maximum number of iterations, the method may be forced to exit from the iteration process, and the retraining of the replacement neural network is ended.

In some embodiments, the model size of the replacement neural network can be calculated according to the following Equation (11):

$$\text{model\_size}' = \sum_{j=1}^{J} \sum_{k=1}^{K_j} \alpha'_{jk} * \text{size}\,(conv_{jk}) \tag{11}$$

The same symbols in Equation (10) and Equation (11) have the same meaning, model_size' represents the model size of the replacement neural network, which is determined by the following Equation (12).

$$\alpha'_{jk} = \begin{cases} 1, & \left(k = \underset{k=1,\dots,K_j}{\arg\max}\, \beta_{jk}\right) \\ 0, & \left(k \neq \underset{k=1,\dots,K_j}{\arg\max}\, \beta_{jk}\right) \end{cases} \tag{12}$$

In Equation (12), the operator "arg max" represents taking the maximum value of the $K_j$ weighting factors. In other words, when calculating the model size of the replacement neural network, only the size of the convolutional layer of the operation branch corresponding to the largest weighting factor among all the operation branches in each operation layer to be compressed is included in the model size of in the replacement neural network, and other operation branches are discarded. The size of the replacement neural network model can be calculated during each iteration through the above Equations (11) and (12). Then, a difference between two model sizes of the respective replacement neural networks calculated in two adjacent iterations of the iteration process is compared with a range preset by the user. If the difference is within the preset range, it means that there is no change or the change is small to the model size of the replacement neural networks before and after the iteration, the training can be ended. Otherwise, the replacement neural network is further trained based on the preset dataset.

In block 280, for the $j^{th}$ operation layer to be compressed, the operation branch corresponding to the maximum value of the updated values of the $K_j$ weighting factors is determined as the compressed $j^{th}$ operation layer.

As mentioned above, when the replacement neural network is retrained based on the preset dataset and the convergence condition is reached, it means that the accuracy loss and the model size of the replacement neural network have been relatively balanced. For the $j^{th}$ operation layer to be compressed, the operation branch corresponding to the maximum value of the updated values of the $K_j$ weighting factors can be directly determined as the compressed $j^{th}$ operation layer, and accordingly the J operation layers to be compressed are replaced with J compressed operation layers, so as to obtain the compressed neural network.

Since the parameters of the compressed neural network are represented by numbers with lower bit-width than those of the original neural network, the compressed neural network may take up less storage space and computation resources, and can be more easily deployed on hardware platforms with limited resources.

Figure 5:
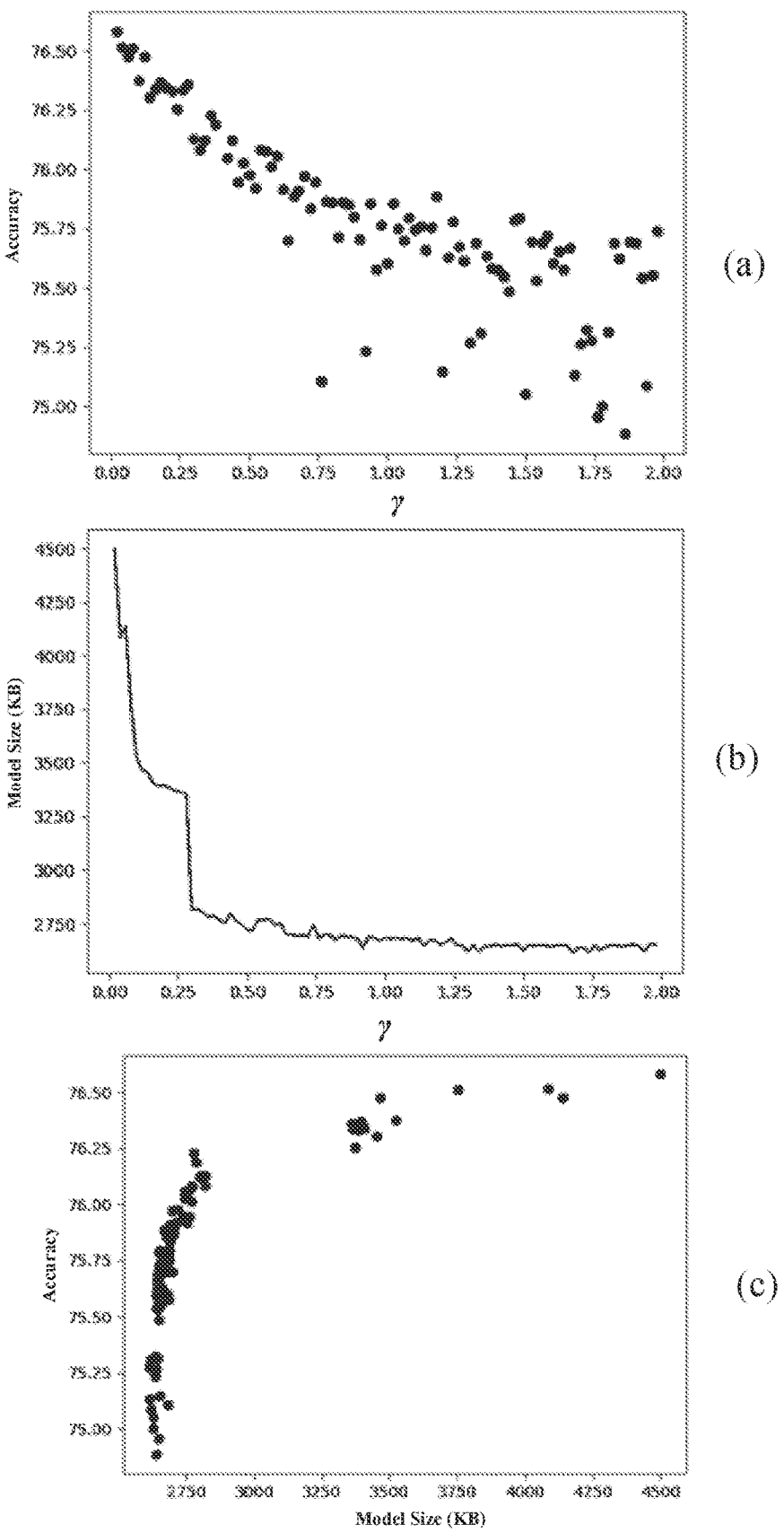
FIG. 5(a), FIG. 5(b), and FIG. 5(c) illustrate relationships between a hyper-parameter $\gamma$, an accuracy and a model size of a network model in a method for compressing a neural network according to an embodiment of the present application.
Figure 6:
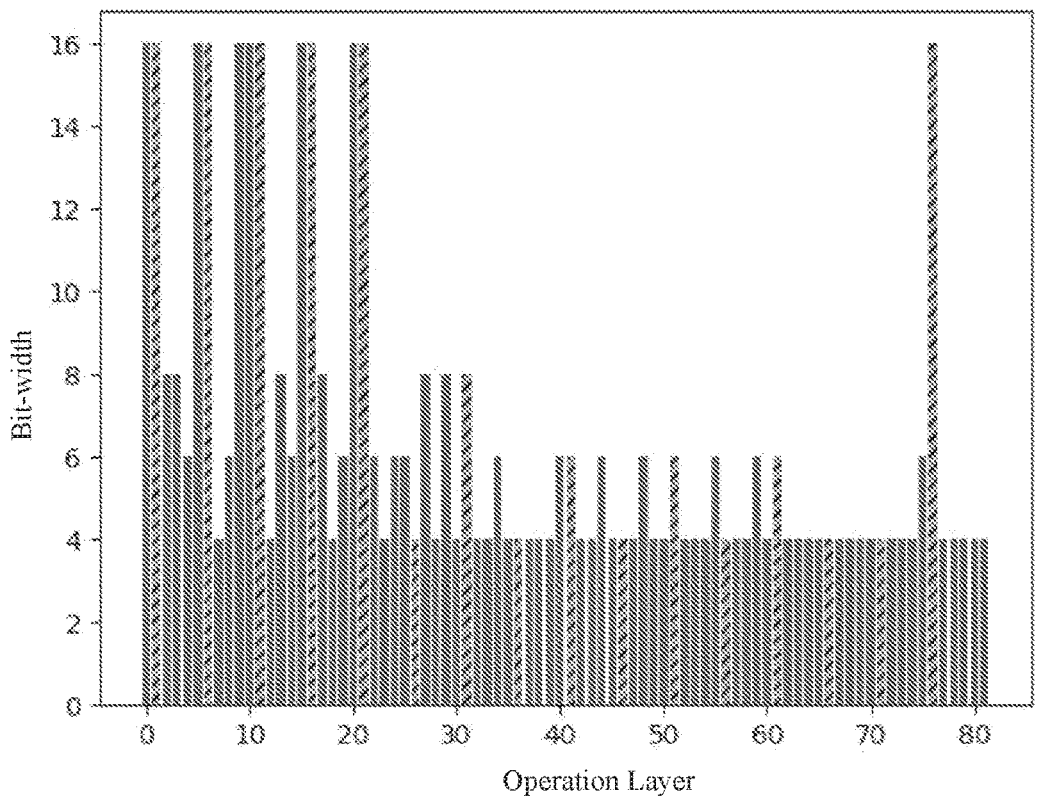
FIG. 6 illustrates a schematic diagram of a compression result of a neural network model according to an embodiment of the present application.

Referring to FIGS. 5(a), 5(b) and 5(c), different test results of applying the method for compressing a neural network of the present application on an EfficientNet-b0 network model are shown. For example, FIG. 5(a) shows changes in the accuracy of compressed the neural network model when different hyper-parameter γ are used, FIG. 5(b) shows changes in the model size of the compressed neural network model when different hyper-parameter γ are used, and FIG. 5(c) shows a correlation between the model size and the accuracy of the compressed neural network. The above test results can be used to guide the selection of hyper-parameter γ under different accuracy and model size requirements. It can be seen that, as the value of the hyper-parameter γ increases, the model becomes smaller and smaller, but the accuracy becomes lower and lower. The reason may be that the increment of the hyper-parameter γ represents that the model size accounts for a larger proportion of the model loss function Loss. In an extreme case, the loss function part loss1 may be omitted, and the compressed model may converge to choose the configuration with the most economical hardware. However, in practical applications, it is expected that the accuracy loss is small while the neural network model is compressed, and thus the hyper-parameter γ should not be set too large. After many simulation studies by the inventors, it is advisable to set the hyper-parameter γ between 0.25 and 0.5. FIG. 6 shows bit-widths used by parameters of different operation layers after being hybridly quantized by the method for compressing a neural network of the present application, when the hyper-parameter γ is set to 0.36. In FIG. 6, the slashed columns correspond to the depthwise convolution (DWC) layers, and the other columns represents other operation layers except the DWC layers. It can be seen from FIG. 6 that, most of the front-end operation layers in the neural network are quantized with a higher bit-width, while the back-end operation layers are quantized with a lower bit-width, that is because the front-end operation layers have fewer parameters and have greater impact on the network performance. In addition, the DWC layer, which has higher computational complexity and greater impact on the network performance, also generally uses a higher bit-width for quantization than its adjacent operation layers. Table 1 below shows the comparison of the model sizes and the accuracies of an original neural network (FP 32), a neural network compressed by a uniform 8-bit quantization scheme, and a neural network compressed by the hybrid quantization scheme using the method for compressing a neural network of the present application. As can be seen from Table 1, the hybrid quantization scheme using the method of the present application can achieve better classification performance (i.e., 76.228% accuracy) when the model compression ratio exceeds 86%.

TABLE 1

| Neural Network | Model Size (KB) | Accuracy (%) |
| --- | --- | --- |
| FP32 | 20454 (32 bit/per weight) | 76.840 |
| Uniform 8-Bit Quantization Scheme | 5114 (8 bit/per weight) | 69.33 |
| Hybrid Quantization Scheme | 2780 (average 4.35 bit/per weight) | 76.228 |

Figure 7:
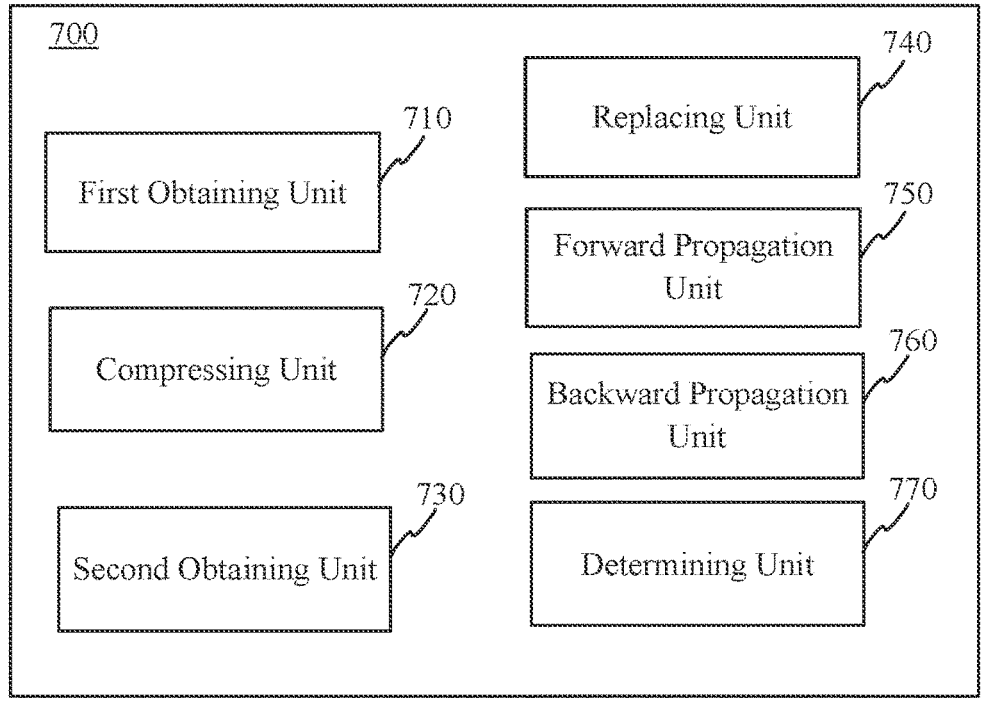
FIG. 7 illustrates a block diagram of a device for compressing a neural network according to an embodiment of the present application.

According another embodiment of the present application, a device for compressing a neural network is provided. As shown in FIG. 7, a device 700 for compressing a neural network includes: a first obtaining unit 710, a compressing unit 720, a second obtaining unit 730, a replacing unit 740, a forward propagation unit 750, a backward propagation unit 760, and a determining unit 770. The first obtaining unit 710 is configured for obtaining an original neural network to be compressed, the original neural network including J operation layers to be compressed, where J is an integer greater than 1. The compressing unit 720 is configured for compressing a $j^{th}$ operation layer of the J operation layers with $K_j$ different compression ratios to generate $K_j$ operation branches, where j and $K_j$ are integers, $1 \leq j \leq J$, and $K_j \geq 1$. The second obtaining unit 730 is configured for obtaining, for the $j^{th}$ operation layer, a set of $K_j$ weighting factors corresponding to the respective $K_j$ operation branches, where the $K_j$ weighting factors have respective initial values. The replacing unit 740 is configured for replacing the $j^{th}$ operation layer with the $K_j$ operation branches weighted by the set of $K_j$ weighting factors, to generate a replacement neural network. The forward propagation unit 750 is configured for performing forward propagation to the replacement neural network based on a preset dataset, where a weighted sum operation is performed on $K_j$ operation results generated by the $K_j$ operation branches with the $K_j$ weighting factors and a result of the weighted sum operation is used as an output of $j^{th}$ operation layer. The backward propagation unit 760 is configured for performing backward propagation to the replacement neural network based on the preset dataset, where, for the $j^{th}$ operation layer, updated values of the $K_j$ weighting factors are calculated based on a model loss of the replacement neural network relative to the original neural network. The determining unit 770 is configured for determining, for the $j^{th}$ operation layer, an operation branch corresponding to a maximum value of the updated values of the $K_j$ weighting factors as a compressed $j^{th}$ operation layer. More details about the device 700 may refer to the above corresponding method described in conjunction with FIGS. 1 to 6, and will not be elaborated herein.

In some embodiments, the device for compressing a neural network may be implemented as one or more of an application-specific integrated circuits (ASIC), a digital signal processor (DSP), a digital signal processing device (DSPD), a programmable logic device (PLD), a field programmable gate array (FPGA), a controller, a microcontroller, a microprocessor or other electronic components. In addition, the device embodiments described above are only for the purpose of illustration. For example, the division of the units is only a logical function division, and there may be other divisions in actual implementations. For example, multiple units or components may be combined or may be integrate into another system, or some features can be omitted or not implemented. In addition, the displayed or discussed mutual coupling, direct coupling or communication connection may be indirect coupling or indirect communication connection through some interfaces, devices or units in electrical or other forms. The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In other embodiments, the device compressing a neural network can also be implemented in the form of a software functional unit. If the functional unit is implemented in the form of a software functional unit and sold or used as an independent product, it can be stored in a computer readable storage medium and can be executed by a computer device. Based on this understanding, the essential of the technical solution of this application, or the part that contributes to the conventional technology, or all or part of the technical solution, can be embodied in the form of a software product, which is stored in a storage medium. The software product may include a number of instructions to enable a computer device (for example, a personal computer, a mobile terminal, a server, or a network device, etc.) to perform all or part of steps of the method in each embodiment of the present application.

In other embodiments of the present application, an electronic device is provided. The electronic device includes a processor and a storage device. The storage device is configured to store a computer program that can run on the processor. When the computer program is executed by the processor, the processor is caused to execute the method for compressing a neural network in the foregoing embodiments. In some embodiments, the electronic device may be a mobile terminal, a personal computer, a tablet computer, a server, etc.

In other embodiments of the present application, a non-transitory computer-readable storage medium is provided. The non-transitory computer-readable storage medium stores a computer program, and when the computer program is executed by a processor, the method for compressing a neural network is performed. In some embodiments, the non-transitory computer-readable storage medium may be a flash memory, a read only memory (ROM), an electrically programmable ROM, an electrically erasable and programmable ROM, register, hard disk, removable disk, CD-ROM, or any other form of non-transitory computer-readable storage medium known in the art.

Those skilled in the art will be able to understand and implement other changes to the disclosed embodiments by studying the specification, disclosure, drawings and appended claims. In the claims, the wordings "comprise", "comprising", "include" and "including" do not exclude other elements and steps, and the wordings "a" and "an" do not exclude the plural. In the practical application of the present application, one component may perform the functions of a plurality of technical features cited in the claims. Any reference numeral in the claims should not be construed as limit to the scope.

What is claimed is:
1. A method for compressing a neural network, comprising:
obtaining an original neural network to be compressed, the original neural network comprising J operation layers to be compressed, where J is an integer greater than 1;

compressing a $j^{th}$ operation layer of the J operation layers with $K_j$ different compression ratios to generate $K_j$ operation branches, where j and $K_j$ are integers, $1 \leq j \leq J$, and $K_j \geq 1$;

obtaining, for the $j^{th}$ operation layer, a set of $K_j$ weighting factors corresponding to the respective $K_j$ operation branches, where the $K_j$ weighting factors have respective initial values;

replacing the $j^{th}$ operation layer with the $K_j$ operation branches weighted by the set of $K_j$ weighting factors, to generate a replacement neural network;

performing forward propagation to the replacement neural network based on a preset dataset to generate $K_j$ operation results, where a weighted sum operation is performed on the $K_j$ operation results with the $K_j$ weighting factors and a result of the weighted sum operation is used as an output of the $j^{th}$ operation layer, and where the $K_j$ operation results is generated by;

compressing an input data from the preset dataset to generate $K_j$ compressed input data corresponding to the $K_j$ operation branches respectively, where the $K_j$ compressed input data have $K_j$ different accuracies corresponding to the $K_j$ different compression ratios of the $K_j$ operation branches respectively; and performing the forward propagation on the $K_j$ replaced operation branches and the $K_j$ compressed input data to generate the $K_j$ operation results;

performing backward propagation to the replacement neural network based on the preset dataset, where, for the $j^{th}$ operation layer, updated values of the $K_j$ weighting factors are calculated based on a model loss of the replacement neural network relative to the original neural network, wherein the model loss is determined based on a product of a loss function determined based on an application type of the original neural network, and a performance index related to a hardware index of a hardware platform on which the original neural network is to be deployed; and determining, for the $j^{th}$ operation layer, an operation branch corresponding to a maximum value of the updated values of the $K_j$ weighting factors as a compressed $j^{th}$ operation layer.

2. The method of claim 1, wherein the application type of the original neural network comprises: classification, positioning, detection or segmentation.

3. The method of claim 1, wherein the forward propagation and the backward propagation to the replacement neural network are iteratively performed for multiple times based on the preset dataset, and in the iteration process of the forward propagation and the backward propagation, the updated values of the $K_j$ weighting factors obtained in a backward propagation are assigned to the $K_j$ weighting factors to be used in a forward propagation next to the backward propagation.

4. The method of claim 3, further comprising:

calculating, in the iteration process, a model size of the replacement neural network based on the operation branch corresponding to the maximum value of the updated values of the $K_j$ weighting factors;

obtaining a change in the model size of the replacement neural network calculated after each iteration of the iteration process; and stopping the iteration process when the change is within a preset range.

5. The method of claim 1, wherein the $j^{th}$ operation layer to be compressed comprises a convolutional layer, an activation layer, a batch normalization layer, a pooling layer, or a fully connected layer.

6. The method of claim 1, further comprising:

normalizing values of the $K_j$ weighting factors before performing the weighted sum operation on the $K_j$ operation results generated by the $K_j$ operation branches with the $K_j$ weighting factors.

7. The method of claim 1, wherein a parameter of the $j^{th}$ operation layer is represented by an $N_{0j}$-bit binary number, parameters of the $K_j$ operation branches are represented by $N_{1j}$-bit, $N_{2j}$-bit, . . . , $N_{Kj}$-bit binary numbers respectively, $N_{0j}$, $N_{1j}$, $N_{2j}$, . . . , $N_{Kj}$ are integers greater than or equal to 1, and $N_{1j}$, $N_{2j}$, . . . , $N_{Kj}$ are less than or equal to $N_{0j}$.

8. The method of claim 1, wherein the hardware index of a hardware platform on which the original neural network is to be deployed comprises: a storage space, a number of floating-point operations, a delay time or a power consumption.

9. A device for compressing a neural network, comprising:

a processor; and a memory, wherein the memory stores program instructions that are executable by the processor, and when executed by the processor, the program instructions cause the processor to perform:

obtaining an original neural network to be compressed, the original neural network comprising J operation layers to be compressed, where J is an integer greater than 1;

compressing a $j^{th}$ operation layer of the J operation layers with $K_j$ different compression ratios to generate $K^j$ operation branches, where j and $K_j$ are integers, $1 \leq j \leq J$, and $K_j \geq 1$;

obtaining, for the $j^{th}$ operation layer, a set of $K_j$ weighting factors corresponding to the respective $K_j$ operation branches, where the $K_j$ weighting factors have respective initial values;

replacing the $j^{th}$ operation layer with the $K_j$ operation branches weighted by the set of $K_j$ weighting factors, to generate a replacement neural network;

performing forward propagation to the replacement neural network based on a preset dataset to generate $K_j$ operation results, where a weighted sum operation is performed on the $K_j$ operation results with the $K_j$ weighting factors and a result of the weighted sum operation is used as an output of the $j^{th}$ operation layer, and where the $K_j$ operation results is generated by;

compressing an input data from the preset dataset to generate $K_j$ compressed input data corresponding to the $K_j$ operation branches respectively, where the $K_j$ compressed input data have $K_j$ different accuracies corresponding to the $K_j$ different compression ratios of the $K_j$ operation branches respectively; and performing the forward propagation on the $K_j$ replaced operation branches and the $K_j$ compressed input data to generate the $K_j$ operation results;

performing backward propagation to the replacement neural network based on the preset dataset, where, for the $j^{th}$ operation layer, updated values of the $K_j$ weighting factors are calculated based on a model loss of the replacement neural network relative to the original neural network, wherein the model loss is determined based on a product of a loss function determined based on an application type of the original neural network, and a performance index related to a hardware index of a hardware platform on which the original neural network is to be deployed; and determining, for the $j^{th}$ operation layer, an operation branch corresponding to a maximum value of the updated values of the $K_j$ weighting factors as a compressed $j^{th}$ operation layer.

10. The device of claim 9, wherein the application type of the original neural network comprises: classification, positioning, detection or segmentation.

11. The device of claim 9, wherein the forward propagation and the backward propagation to the replacement neural network are iteratively performed for multiple times based on the preset dataset, and in the iteration process of the forward propagation and the backward propagation, the updated values of the $K_j$ weighting factors obtained in a backward propagation are assigned to the $K_j$ weighting factors to be used in a forward propagation next to the backward propagation.

12. The device of claim 11, wherein when executed by the processor, the program instructions further cause the processor to perform:

calculating, in the iteration process, a model size of the replacement neural network based on the operation branch corresponding to the maximum value of the updated values of the $K_j$ weighting factors;

obtaining a change in the model size of the replacement neural network calculated after each iteration of the iteration process; and stopping the iteration process when the change is within a preset range.

13. The device of claim 9, wherein the $j^{th}$ operation layer to be compressed comprises a convolutional layer, an activation layer, a batch normalization layer, a pooling layer, or a fully connected layer.

14. The device of claim 9, when executed by the processor, the program instructions further cause the processor to perform:

normalizing values of the $K_j$ weighting factors before performing the weighted sum operation on the $K_j$ operation results generated by the $K_j$ operation branches with the $K_j$ weighting factors.

15. The device of claim 9, wherein a parameter of the $j^{th}$ operation layer is represented by an $N_{0j}$-bit binary number, parameters of the $K_j$ operation branches are represented by $N_{1j}$-bit, $N_{2j}$-bit, . . . , $N_{K_j j}$-bit binary numbers respectively, $N_{0j}$, $N_{1j}$, $N_{2j}$, . . . , $N_{K_j}$ are integers greater than or equal to 1, and $N_{1j}$, $N_{2j}$, . . . , $N_{K_j}$ are less than or equal to $N_{0j}$.

16. The device of claim 9, wherein the hardware index of a hardware platform on which the original neural network is to be deployed comprises: a storage space, a number of floating-point operations, a delay time or a power consumption.

17. A non-transitory computer-readable storage medium having stored therein instructions that, when executed by a processor, cause the processor to perform a method for compressing a neural network, the method comprising:

obtaining an original neural network to be compressed, the original neural network comprising J operation layers to be compressed, where J is an integer greater than 1;

compressing a $j^{th}$ operation layer of the J operation layers with $K_j$ different compression ratios to generate $K_j$ operation branches, where j and $K_j$ are integers, $1 \leq j \leq J$, and $K_j \geq 1$;

obtaining, for the $j^{th}$ operation layer, a set of $K_j$ weighting factors corresponding to the respective $K_j$ operation branches, where the $K_j$ weighting factors have respective initial values;

replacing the $j^{th}$ operation layer with the $K_j$ operation branches weighted by the set of $K_j$ weighting factors, to generate a replacement neural network;

performing forward propagation to the replacement neural network based on a preset dataset to generate $K_j$ operation results, where a weighted operation is performed on the $K_j$ operation results with the $K_j$ weighting factors and a result of the weighted sum operation is used as an output of $j^{th}$ operation layer, and wherein the $K_j$ operation results is generated by;

compressing an input data from the preset dataset to generate $K_j$ compressed input data corresponding to the $K_j$ operation branches respectively, where the $K_j$ compressed input data have $K_j$ different accuracies corresponding to the $K_j$ different compression ratios of the $K_j$ operation branches respectively; and performing the forward propagation on the $K_j$ replaced operation branches and the $K_j$ compressed input data to generate the $K_j$ operation results;

performing backward propagation to the replacement neural network based on the preset dataset, where, for the $j^{th}$ operation layer, updated values of the $K_j$ weighting factors are calculated based on a model loss of the replacement neural network relative to the original neural network, wherein the model loss is determined based on a product of a loss function determined based on an application type of the original neural network, and a performance index related to a hardware index of a hardware platform on which the original neural network is to be deployed; and determining, for the $j^{th}$ operation layer, an operation branch corresponding to a maximum value of the updated values of the $K_j$ weighting factors as a compressed $j^{th}$ operation layer.

* * * * *